US008624912B2

(12) United States Patent
Kumakura et al.

(10) Patent No.: US 8,624,912 B2
(45) Date of Patent: Jan. 7, 2014

(54) PROGRAM, IMAGE GENERATION DEVICE, AND IMAGE GENERATION METHOD

(75) Inventors: Takashi Kumakura, Matsudo (JP); Noriyuki Hiyama, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 1189 days.

(21) Appl. No.: 12/508,889

(22) Filed: Jul. 24, 2009

(65) Prior Publication Data

US 2010/0020077 A1    Jan. 28, 2010

(30) Foreign Application Priority Data

Jul. 28, 2008  (JP) ................................ 2008-194218

(51) Int. Cl.
| | |
|---|---|
| *G06T 17/00* | (2006.01) |
| *G09G 5/00* | (2006.01) |
| *G09G 5/02* | (2006.01) |
| *G06T 1/00* | (2006.01) |
| *G09G 5/36* | (2006.01) |
| *G06K 9/00* | (2006.01) |
| *G06K 9/40* | (2006.01) |
| *G06K 9/20* | (2006.01) |
| *G06K 9/60* | (2006.01) |

(52) U.S. Cl.
USPC ........... 345/589; 345/420; 345/593; 345/619; 345/501; 345/549; 382/165; 382/254; 382/282; 382/305; 382/307

(58) Field of Classification Search
USPC ......... 345/418–420, 581, 589–590, 593–594, 345/597, 600–601, 619, 636, 501, 549; 358/518–519, 537–538, 452–453, 540, 358/448; 382/152, 165–167; 254/254, 274, 254/276, 282, 285, 305, 307

See application file for complete search history.

(56) References Cited

U.S. PATENT DOCUMENTS

| | | | |
|---|---|---|---|
| 5,909,220 A * | 6/1999 | Sandow | 345/589 |
| 7,233,338 B2 | 6/2007 | Orihara | |
| 2001/0027129 A1* | 10/2001 | Harima | 463/32 |
| 2006/0217008 A1 | 9/2006 | Higashino et al. | |
| 2006/0285755 A1* | 12/2006 | Hager et al. | 382/224 |
| 2010/0001993 A1* | 1/2010 | Finn et al. | 345/419 |
| 2010/0020083 A1* | 1/2010 | Kumakura et al. | 345/441 |
| 2010/0194776 A1* | 8/2010 | Chong et al. | 345/594 |
| 2010/0234106 A1 | 9/2010 | Kojima et al. | |

FOREIGN PATENT DOCUMENTS

| | | |
|---|---|---|
| JP | A-2004-105532 | 4/2004 |
| JP | A-2006-268406 | 10/2006 |
| JP | A-2007-260197 | 10/2007 |

OTHER PUBLICATIONS

U.S. Appl. No. 12/508,825, filed Jul. 24, 2009 in the name of Kumakura et al.
U.S. Appl. No. 12/508,826, filed Jul. 24, 2009 in the name of Kumakura et al.

\* cited by examiner

*Primary Examiner* — Wesner Sajous
(74) *Attorney, Agent, or Firm* — Oliff & Berridge, PLC

(57) ABSTRACT

A program causing a computer to select a first color range from a plurality of color ranges based on input information, and to determine a color within the first color range to be a color of one of part objects corresponding to categories that form main parts of a model object under a predetermined condition.

13 Claims, 12 Drawing Sheets

FIG. 4

| CATEGORY | PRIORITY INFORMATION | PART OBJECT | DESIGNATION INFORMATION | SLOT | (SLOT-UNIT) PART OBJECT DATA |
|---|---|---|---|---|---|
| Head | 5 | SAMURAI HELMET | NULL | A1 | Head_A1_1 |
| | | TOP HAT | NULL | A1 | Head_A1_2 |
| | | BURGONET | MASK | A1 | Head_A1_3 |
| | | ... | ... | ... | ... |
| Mask | 4 | VENETIAN MASK | Head, Neck | A2 | Mask_A2_1 |
| | | SHEET MASK | Neck | A2 | Mask_A2_2 |
| | | ... | ... | ... | ... |
| Neck | 13 | CLOAK | Head, Mask | A3 | Neck_A3_1 |
| | | ... | ... | ... | ... |
| Inner | 9 | T-SHIRT | NULL | A3 | Inner_A3_1 |
| | | | | A4 | Inner_A4_1 |
| | | | | A8 | Inner_A8_1 |
| | | | | A9 | Inner_A9_1 |
| | | ... | | ... | ... |

FIG. 9

| PART | CATEGORY | PART OBJECT | COLOR OF PRIMARY AREA (COLOR CODE) | COLOR OF SECONDARY AREA (COLOR CODE) |
|---|---|---|---|---|
| MAIN PART | Inner | T-SHIRT | 003AEA | 009525 |
| | Lower | TROUSERS | 00B6EA | 00FF40 |
| SECONDARY PART | Head | TOP HAT | FF0000 | 00D535 |
| | Shoulder | SHOULDER PAD | FF2B2B | 00EA3A |
| | Feet | SHOES | D50035 | 00BF30 |

8,624,912 B2

PROGRAM, IMAGE GENERATION DEVICE, AND IMAGE GENERATION METHOD

Japanese Patent Application No. 2008-194218, filed on Jul. 28, 2008, is hereby incorporated by reference in its entirety.

BACKGROUND OF THE INVENTION

The present invention relates to a program, an image generation device, and an image generation method.

An image generation device (game device) that generates an image viewed from a virtual camera (given viewpoint) in an object space (virtual three-dimensional space) has been known. Such an image generation device is very popular as a system that allows experience of virtual reality.

An image generation device that allows the player to arbitrarily customize the player's character has been known (JP-A-2006-268406). A related-art image generation device allows the player to select desired part objects to create an original model object.

However, a related-art image generation device does not allow the player to create a unified model object while reflecting the preference of the player.

SUMMARY

According to a first aspect of the invention, there is provided a program that is stored in a computer-readable information storage medium and generates an image of a model object formed by a plurality of part objects, the program causing a computer to function as:

a storage section that stores the plurality of part objects, each of the plurality of part objects being classified into one of a plurality of categories;

a setting section that selects a part object from the plurality of part objects for each of the plurality of categories, and sets the selected part object as an element of the model object;

a color range determination section that selects a first color range from a plurality of color ranges based on input information; and a color determination section that determines a color within the first color range to be a color of one of part objects corresponding to categories that form main parts of the model object under a predetermined condition.

According to a second aspect of the invention, there is provided a program that is stored in a computer-readable information storage medium and generates an image of a model object formed by a plurality of part objects, the program causing a computer to function as:

a storage section that stores the plurality of part objects, each of the plurality of part objects being classified into one of a plurality of categories;

a setting section that selects a part object from the plurality of part objects for each of the plurality of categories, and sets the selected part object as an element of the model object;

a selectable design information determination section that determines a plurality of pieces of selectable design information based on input information; and a design information determination section that selects one piece of design information from the plurality of pieces of selectable design information under a predetermined condition, and determines the selected piece of design information to be design information of one of part objects corresponding to categories that form main parts of the model object.

According to a third aspect of the invention, there is provided a program that is stored in a computer-readable information storage medium and generates an image of a model object formed by a plurality of part objects, the program causing a computer to function as:

a storage section that stores the plurality of part objects, each of the plurality of part objects being classified into one of a plurality of categories;

a setting section that selects a part object from the plurality of part objects for each of the plurality of categories, and sets the selected part object as an element of the model object;

a selectable texture determination section that determines a plurality of selectable textures based on input information; and a texture determination section that selects one texture from the plurality of selectable textures under a predetermined condition, and determines the selected texture to be a texture to be mapped onto one of part objects corresponding to categories that form main parts of the model object.

According to a fourth aspect of the invention, there is provided an image generation device that generates an image of a model object formed by a plurality of part objects, the image generation device comprising:

a storage section that stores the plurality of part objects, each of the plurality of part objects being classified into one of a plurality of categories;

a setting section that selects a part object from the plurality of part objects for each of the plurality of categories, and sets the selected part object as an element of the model object;

a color range determination section that selects a first color range from a plurality of color ranges based on input information; and a color determination section that determines a color within the first color range to be a color of one of part objects corresponding to categories that form main parts of the model object under a predetermined condition.

According to a fifth aspect of the invention, there is provided an image generation device that generates an image of a model object formed by a plurality of part objects, the image generation device comprising:

a storage section that stores the plurality of part objects, each of the plurality of part objects being classified into one of a plurality of categories;

a setting section that selects a part object from the plurality of part objects for each of the plurality of categories, and sets the selected part object as an element of the model object;

a selectable design information determination section that determines a plurality of pieces of selectable design information based on input information; and a design information determination section that selects one piece of design information from the plurality of pieces of selectable design information under a predetermined condition, and determines the selected piece of design information to be design information of one of part objects corresponding to categories that form main parts of the model object.

According to a sixth aspect of the invention, there is provided an image generation device that generates an image of a model object formed by a plurality of part objects, the image generation device comprising:

a storage section that stores the plurality of part objects, each of the plurality of part objects being classified into one of a plurality of categories;

a setting section that selects a part object from the plurality of part objects for each of the plurality of categories, and sets the selected part object as an element of the model object;

a selectable texture determination section that determines a plurality of selectable textures based on input information; and a texture determination section that selects one texture from the plurality of selectable textures under a predetermined condition, and determines the selected texture to be a texture to be mapped onto one of part objects corresponding to categories that form main parts of the model object.

According to a seventh aspect of the invention, there is provided an image generation method of generating an image of a model object formed by a plurality of part objects, the image generation method, performed by an image generation device having a processor, comprising:

storing the plurality of part objects in a storage section, each of the plurality of part objects being classified into one of a plurality of categories;

selecting a part object from the plurality of part objects for each of the plurality of categories, and sets the selected part object as an element of the model object;

selecting a first color range from a plurality of color ranges based on input information; and determining a color within the first color range to be a color of one of part objects corresponding to categories that form main parts of the model object under a predetermined condition.

According to an eighth aspect of the invention, there is provided an image generation method of generating an image of a model object formed by a plurality of part objects, the image generation method, performed by an image generation device having a processor, comprising:

storing the plurality of part objects in a storage section, each of the plurality of part objects being classified into one of a plurality of categories;

selecting a part object from the plurality of part objects for each of the plurality of categories, and sets the selected part object as an element of the model object;

determining a plurality of pieces of selectable design information based on input information; and selecting one piece of design information from the plurality of pieces of selectable design information under a predetermined condition, and determining the selected piece of design information to be design information of one of part objects corresponding to categories that form main parts of the model object.

According to a ninth aspect of the invention, there is provided an image generation method of generating an image of a model object formed by a plurality of part objects, the image generation method, performed by an image generation device having a processor, comprising:

storing the plurality of part objects in a storage section, each of the plurality of part objects being classified into one of a plurality of categories;

selecting a part object from the plurality of part objects for each of the plurality of categories, and sets the selected part object as an element of the model object;

determining a plurality of selectable textures based on input information; and selecting one texture from the plurality of selectable textures under a predetermined condition, and determining the selected texture to be a texture to be mapped onto one of part objects corresponding to categories that form main parts of the model object.

BRIEF DESCRIPTION OF THE SEVERAL VIEWS OF THE DRAWING

FIG. 4 illustrates a table illustrating the relationship among a category, a part object, and the like.
FIG. 9 is a table illustrating a method of determining the color of a part object.

DETAILED DESCRIPTION OF THE EMBODIMENT

Figure 1:
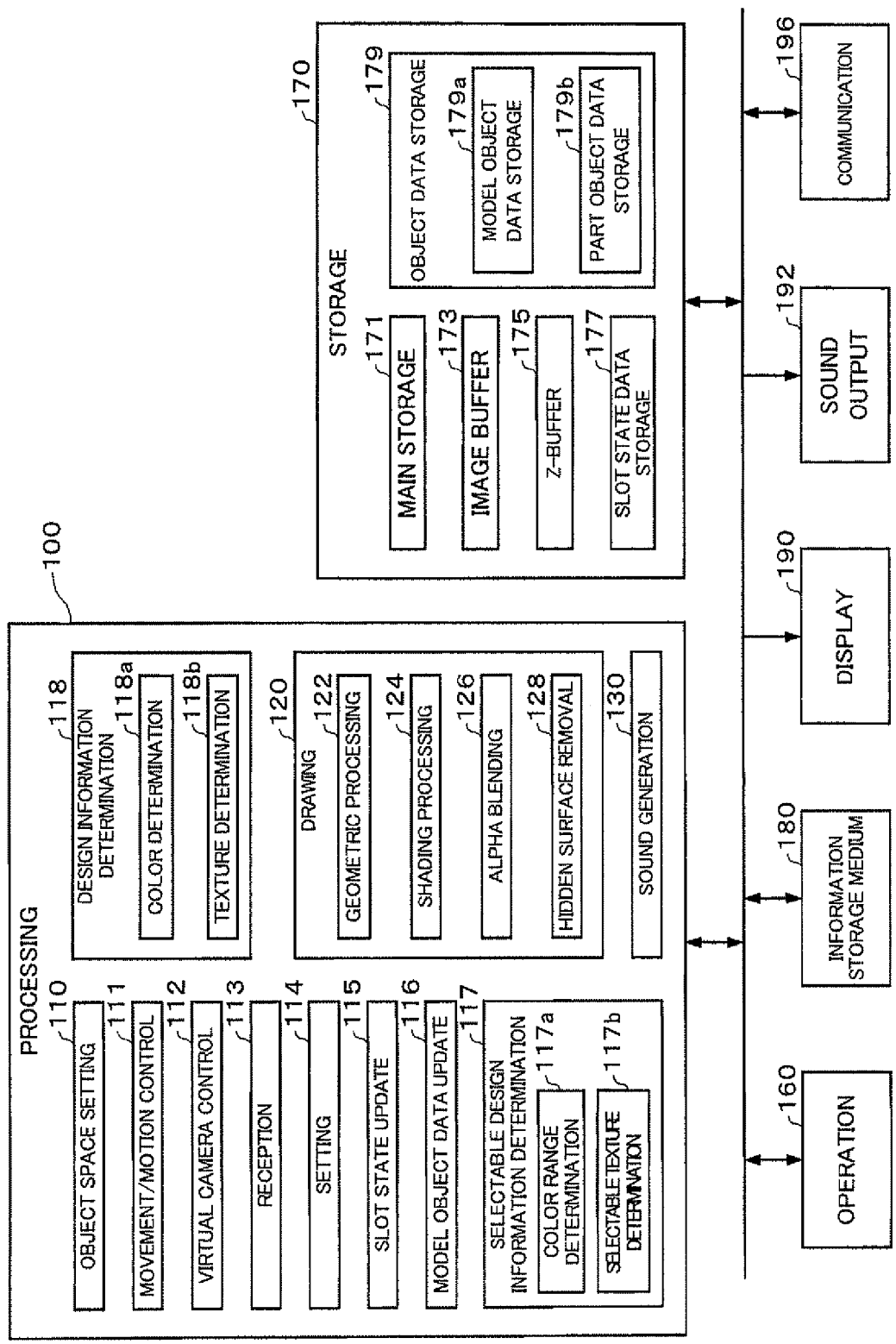
FIG. 1 is a functional block diagram of an image generation device according to one embodiment of the invention.

The invention may provide a program, an image generation device, and an image generation method that can determine the color of a part object so that a unified model object is created while reflecting the preference of the player.

(1) According to one embodiment of the invention, there is provided a program that is stored in a computer-readable information storage medium and generates an image of a model object formed by a plurality of part objects, the program causing a computer to function as:

a storage section that stores the plurality of part objects, each of the plurality of part objects being classified into one of a plurality of categories;

a setting section that selects a part object from the plurality of part objects for each of the plurality of categories, and sets the selected part object as an element of the model object;

a color range determination section that selects a first color range from a plurality of color ranges based on input information; and a color determination section that determines a color within the first color range to be a color of one of part objects corresponding to categories that form main parts of the model object under a predetermined condition.

According to one embodiment of the invention, there is provided a computer-readable information storage medium storing a program that causes a computer to function as the above-described sections. According to one embodiment of the invention, there is provided an image generation device comprising the above-described sections.

According to the above embodiments, similar colors are assigned to the main parts of the model object. Therefore, the color of the part object can be determined so that a unified model object is created while reflecting the preference of the player.

(2) In each of the above program, information storage medium and image generation device, the color determination section may randomly select a color within the first color range and determine the selected color to be a color of one of the part objects.

The model object becomes monotonous if an identical color is assigned to all of the part objects belonging to the categories forming main parts of the model object. According to the above embodiment, however, since the colors of the part objects belonging to the categories forming the main parts of the model object can be caused to differ within the same color range, the color of the part object can be determined so that the color arrangement of the part objects does not become monotonous while creating a unified model object.

(3) In each of the above program, information storage medium and image generation device, the color range determination section may select a second color range that differs from the first color range from the plurality of color ranges; and the color determination section may determine a color within the second color range to be a color of one of part objects corresponding to categories that form secondary parts of the model object under a predetermined condition.

According to the above embodiment, since similar colors are assigned to the part objects belonging to the categories forming secondary parts of the model object while assigning different colors to the main parts and the secondary parts, the colors of the part objects can be determined so that a unified model object is created while ensuring a wide variety of combinations with regard to the colors of the main parts and the secondary parts.

(4) In each of the above program, information storage medium and image generation device, the color determination section may randomly select a color within the second color range and determine the selected color to be a color of one of the part objects.

According to the above embodiment, since the colors of the part objects belonging to the categories forming the secondary parts of the model object can be caused to differ within the same color range, the colors of the part objects can be determined so that the color arrangement of the part objects does not become monotonous while creating a unified model object.

(5) In each of the above program, information storage medium and image generation device, the color range determination section may select a third color range that differs from the first color range and the second color range from among the plurality of color ranges;

the color determination section may determine a color within the first color range to be a color of a first area of one of the part objects corresponding to categories that form the main parts of the model object under a predetermined condition, and determine a color within the third color range to be a color of a second area of one of the part objects under a predetermined condition, the second area being smaller than the first area; and the color determination section may determine a color within the second color range to be a color of a third area of one of the part objects corresponding to categories that form the secondary parts of the model object under a predetermined condition, and determine a color within the third color range to be a color of a fourth area of one of the part objects under a predetermined condition, the fourth area being smaller than the third area.

According to the above embodiment, the number of combinations of the colors assigned to the first area and the second area and the colors assigned to the third area and the fourth area can be increased in addition to the number of combinations of the colors assigned to the main parts and the secondary parts. According to the above embodiment, since similar colors are assigned to the second area and the fourth area, the number of combinations of colors can be increased while creating a unified model object.

(6) According to one embodiment of the invention, there is provided a program that is stored in a computer-readable information storage medium and generates an image of a model object formed by a plurality of part objects, the program causing a computer to function as:

a storage section that stores the plurality of part objects, each of the plurality of part objects being classified into one of a plurality of categories;

a setting section that selects a part object from the plurality of part objects for each of the plurality of categories, and sets the selected part object as an element of the model object;

a selectable design information determination section that determines a plurality of pieces of selectable design information based on input information; and a design information determination section that selects one piece of design information from the plurality of pieces of selectable design information under a predetermined condition, and determines the selected piece of design information to be design information of one of part objects corresponding to categories that form main parts of the model object.

According to one embodiment of the invention, there is provided a computer-readable information storage medium storing a program that causes a computer to function as the above-described sections. According to one embodiment of the invention, there is provided an image generation device comprising the above-described sections.

(7) According to one embodiment of the invention, there is provided a program that is stored in a computer-readable information storage medium and generates an image of a model object formed by a plurality of part objects, the program causing a computer to function as:

a storage section that stores the plurality of part objects, each of the plurality of part objects being classified into one of a plurality of categories;

a setting section that selects a part object from the plurality of part objects for each of the plurality of categories, and sets the selected part object as an element of the model object;

a selectable texture determination section that determines a plurality of selectable textures based on input information; and a texture determination section that selects one texture from the plurality of selectable textures under a predetermined condition, and determines the selected texture to be a texture to be mapped onto one of part objects corresponding to categories that form main parts of the model object.

According to one embodiment of the invention, there is provided a computer-readable information storage medium storing a program that causes a computer to function as the above-described sections. According to one embodiment of the invention, there is provided an image generation device comprising the above-described sections.

(8) According to one embodiment of the invention, there is provided an image generation method of generating an image of a model object formed by a plurality of part objects, the image generation method, performed by an image generation device having a processor, comprising:

storing the plurality of part objects in a storage section, each of the plurality of part objects being classified into one of a plurality of categories;

selecting a part object from the plurality of part objects for each of the plurality of categories, and sets the selected part object as an element of the model object;

selecting a first color range from a plurality of color ranges based on input information; and determining a color within the first color range to be a color of one of part objects corresponding to categories that form main parts of the model object under a predetermined condition.

(9) According to one embodiment of the invention, there is provided an image generation method of generating an image of a model object formed by a plurality of part objects, the image generation method, performed by an image generation device having a processor, comprising:

storing the plurality of part objects in a storage section, each of the plurality of part objects being classified into one of a plurality of categories;

selecting a part object from the plurality of part objects for each of the plurality of categories, and sets the selected part object as an element of the model object;

determining a plurality of pieces of selectable design information based on input information; and selecting one piece of design information from the plurality of pieces of selectable design information under a predetermined condition, and determining the selected piece of design information to be design information of one of part objects corresponding to categories that form main parts of the model object.

(10) According to one embodiment of the invention, there is provided an image generation method of generating an image of a model object formed by a plurality of part objects, the image generation method, performed by an image generation device having a processor, comprising:

storing the plurality of part objects in a storage section, each of the plurality of part objects being classified into one of a plurality of categories;

selecting a part object from the plurality of part objects for each of the plurality of categories, and sets the selected part object as an element of the model object;

determining a plurality of selectable textures based on input information; and selecting one texture from the plurality of selectable textures under a predetermined condition, and determining the selected texture to be a texture to be mapped onto one of part objects corresponding to categories that form main parts of the model object.

Embodiments of the invention will now be described below. Note that the embodiments described below do not unduly limit the scope of the invention as stated in the claims. Also, not all the elements described below should be taken as essential requirements of the invention.

1. Configuration

FIG. 1 illustrates an example of a functional block diagram of an image generation device (game device or terminal) according to one embodiment of the invention. Note that the image generation device according to this embodiment may have a configuration in which some of the elements shown in FIG. 1 are omitted.

An operation section 160 allows the player (operator) to input operation data relating to a player's object (i.e., a player's character operated by the player). The function of the operation section 160 may be implemented by a lever, a button, a steering wheel, a microphone, a touch panel display, a casing, or the like.

A storage section 170 serves as a work area for a processing section 100, a communication section 196, and the like. The function of the storage section 170 may be implemented by a RAM (VRAM) or the like.

A slot state data storage section 177 stores slot state data. The term "slot state data" refers to data that specifies the presence or absence of part object data disposed in each slot and the type of part object data disposed in each slot. Each part object is formed by one or more pieces of part object data. Each piece of part object data is associated with one of the slots. Specifically, the slot state data refers to information for managing the part object data disposed in each slot (i.e., in slot units).

An object data storage section 179 stores object data. The object data storage section 179 according to this embodiment includes a model object data storage section 179a and a part object data storage section 179b.

The model object data storage section 179a stores model object data that is formed by a plurality of part objects. The model object data storage section 179a according to this embodiment includes a plurality of buffers in order to store a plurality of model objects, and stores the model object data in each buffer.

The part object data storage section 179b stores a plurality of part objects. Each of the part objects is classified into one of a plurality of categories and stored in the part object data storage section 179b.

The term "category" refers to an attribute for each part of the model object, such as a head, a neck, or an arm.

Designation information that designates a category that differs from the category of the part object is stored in association with a given part object among the plurality of part objects stored in the part object data storage section 179b.

The term "category of the part object" refers to the category to which the part object belongs. The designation information designates the category of the part object that may adversely affect an image. Specifically, the designation information designates the restriction target category for which a simultaneous setting may be restricted.

In this embodiment, the part object may be downloaded from a server based on input information (e.g., operation information from the operation section 160) input by the player, and stored in the part object data storage section 179b and an information storage medium 180.

The information storage medium 180 (computer-readable medium) stores a program, data, and the like. The function of the information storage medium 180 may be implemented by an optical disk (CD or DVD), a magneto-optical disk (MO), a magnetic disk, a hard disk, a magnetic tape, a memory (ROM), a memory card, or the like.

The processing section 100 performs various processes according to this embodiment based on a program (data) stored in the information storage medium 180.

Specifically, a program that causes a computer to function as each section according to this embodiment (i.e., a program that causes a computer to execute the process of each section) is stored in the information storage medium 180. A player's personal data, game save data, and the like may be stored in the information storage medium 180.

In this embodiment, the model object data and the part object data may be stored in the information storage medium 180, and loaded into the model object data storage section 179a and the part object data storage section 179b, if necessary.

A display section 190 outputs an image generated according to this embodiment. The function of the display section 190 may be implemented by a CRT, an LCD, a touch panel display, a head mount display (HMD), or the like. A sound output section 192 outputs sound generated according to this embodiment. The function of the sound output section 192 may be implemented by a speaker, a headphone, or the like.

The communication section 196 performs various types of control for communicating with the outside (e.g., host device or another image generation device). The function of the communication section 196 may be implemented by hardware such as a processor or a communication ASIC, a program, and the like.

A program (data) that causes a computer to function as each section according to this embodiment may be downloaded from a server through a network, and stored in the storage section 170 or the information storage medium 180. The scope of the invention also includes the program stored in a storage section of the server.

The processing section 100 (processor) performs a game process, an image generation process, a sound generation process, and the like based on operation data from the operation section 160, a program, and the like. The game process includes starting the game when game start conditions have been satisfied, proceeding with the game, disposing an object such as a character or a map, displaying an object, calculating the game result, finishing the game when game end conditions have been satisfied, and the like. The processing section 100 performs various processes using a main storage section 171 of the storage section 170 as a work area. The function of the processing section 100 may be implemented by hardware such as a processor (e.g., CPU or DSP) or an ASIC (e.g., gate array), or a program.

The processing section 100 includes an object space setting section 110, a movement/motion processing section 111, a virtual camera control section 112, a reception section 113, a setting section 114, a slot state update section 115, a model object data update section 116, a selectable design information determination section 117, a design information determination section 118, a drawing section 120, and a sound generation section 130. The processing section 100 may have a configuration in which some of these sections are omitted.

The object space setting section 110 disposes an object (i.e., an object formed by a primitive such as a polygon, a free-form surface, or a subdivision surface) that represents a display object (e.g., model object, character, building, stadium, car, tree, pillar, wall, or map (topography)) in an object space. Specifically, the object space setting section 110 determines the position and the rotational angle (synonymous with orientation or direction) of the model object in a world coordinate system, and disposes the object at the determined position (X, Y, Z) and the determined rotational angle (rotational angles around X, Y, and Z axes).

The movement/motion processing section 111 calculates the movement/motion (movement/motion simulation) of the object (e.g., character, car, or airplane). Specifically, the movement/motion processing section 111 causes the object to move or make a motion (animation) in the object space based on the operation data input by the player using the operation section 160, a program (movement/motion algorithm), various types of data (motion data), and the like. More specifically, the movement/motion processing section 111 performs a simulation process that sequentially calculates movement information (position, rotational angle, speed, or acceleration) and motion information (position or rotational angle of each part object) of the object every frame (1/60th of a second). Note that the term "frame" refers to a time unit when performing an object movement/motion process (simulation process) or an image generation process.

The virtual camera control section 112 controls a virtual camera (viewpoint) for generating an image viewed from a given (arbitrary) viewpoint in the object space. Specifically, the virtual camera control section 112 controls the position (X, Y, Z) or the rotational angle (rotational angles around X, Y, and Z axes) of the virtual camera (i.e., controls the viewpoint position or the line-of-sight direction).

For example, when photographing the object (e.g., character, ball, or car) from behind using the virtual camera, the virtual camera control section 112 controls the position or the rotational angle (direction) of the virtual camera so that the virtual camera follows a change in position or rotation of the object. In this case, the virtual camera control section 112 may control the virtual camera based on information (e.g., position, rotational angle, or speed) of the object obtained by the movement/motion processing section 111. Alternatively, the virtual camera control section 112 may rotate the virtual camera by a predetermined rotational angle, or may move the virtual camera along a predetermined path. In this case, the virtual camera control section 112 controls the virtual camera based on virtual camera data that specifies the position (moving path) or the rotational angle of the virtual camera. When a plurality of virtual cameras (viewpoints) are provided, the virtual camera control section 112 performs the above-described control process for each virtual camera.

The reception section 113 receives selection of the part object for each category. Specifically, the reception section 113 receives selection of one category from among a plurality of categories displayed on the screen based on input information input by the player, and receives selection of one part object among a plurality of part objects belonging to the selected category. Specifically, the reception section 113 according to this embodiment receives selection of one part object belonging to one category based on input information input by the player.

The setting section 114 determines the part object for each category, and sets the determined part object as an element of the model object. For example, the setting section 114 may determine the part object that has been selected and received by the reception section 113 to be the part object of each category.

The setting section 114 may select a plurality of categories from all of the categories under a predetermined condition based on a given algorithm, determine one part object for each of the selected categories under a predetermined conditions and set the determined part object as an element of the model object.

When the category of a specific part object that has been set as an element of the model object has been stored as the designation information of the selected part object and the category of the selected part object has been stored as the designation information of the specific part object, the setting section 114 according to this embodiment sets the selected part object as an element of the model object in place of the specific part object, or, the setting of the selected part object is restricted (and maintains the specific part object as an element of the model object). Specifically, when the category of the specific part object has been stored as the designation information of the selected part object and the category of the selected part object has been stored as the designation information of the specific part object, the selected part object and the already-set part object cannot be set together as elements of the model object.

When the selected part object is set to be an element of the model object and another part object data has been disposed in the slot that corresponds to each of one or more pieces of part object data that forms the selected part object, the slot state update section 115 determines whether or not to update the slot state data based on part object priority information that determines the disposition priority of each part object data, and updates the slot state data stored in the slot state data storage section 177 based on the determination result. Specifically, the slot state update section 115 disposes (sets) the part object data for each slot.

The term "priority information" refers to information for disposing (setting) the part object data with a higher disposition priority (i.e., higher-order part object data) in the slot preferentially over the part object data with a lower disposition priority (i.e., lower-order part object data). The priority information is set for each category.

The model object data update section 116 updates the model object data stored in the model object data storage section 179a based on the slot state data stored in the slot state data storage section 177.

Specifically, the model object data update section 116 may read the part object data disposed in the slot for which the slot state data has been updated from the part object data storage section 179b, and store the part object data in a first buffer (update buffer) of the model object data storage section 179a. The model object data update section 116 may copy the part object data disposed in the slot for which the slot state data has not been updated to the first buffer from a second buffer of the model object data storage section 179a that stores the model object data that has been disposed. Note that the model object data update section 116 may read the part object data disposed in the slot for which the slot state data has not been updated from the part object data storage section 179b, and store the part object data in the first buffer.

The selectable design information determination section 117 determines a plurality of pieces of selectable design information based on input information input by the player. The term "a plurality of pieces of design information" refers to a color range, a plurality of textures, and the like.

A color range determination section 117a selects a first color range from a plurality of color ranges based on input information input by the player. The color range determination section 117a also selects a second color range that differs from the first color range from the plurality of color ranges. The color range determination section 117a also selects a third color range that differs from the first color range and the second color range from the plurality of color ranges.

The term "color range" refers to a color range classified by hue, brightness, and saturation. For example, the plurality of color ranges include a red color range, a yellow color range, a green color range, a blue color range, and a purple color range.

The color range determination section 117a selects the first color range, the second color range, and the third color range from the plurality of color ranges classified by hue, brightness, and saturation based on input information input by the player.

The color range determination section 117a may select the color range based on the saturation (vividness) at an arbitrary level. For example, the color range determination section 117a determines the saturation based on input information input by the player, and selects the first color range, the second color range, and the third color range from a plurality of color ranges of the determined saturation.

The color range determination section 117a may select the color range based on brightness at an arbitrary level. For example, the color range determination section 117a determines a brightness based on input information input by the player, and selects the first color range, the second color range, and the third color range from a plurality of color ranges of the determined brightness.

A selectable texture determination section 117b determines a plurality of selectable textures based on input information input by the player.

The design information determination section 118 selects one piece of design information from a plurality of pieces of selectable design information under a predetermined condition, and determines the selected design information to be the design information of a one of a plurality of part objects belonging to one of a plurality of categories forming main parts of the model object. The term "design information" refers to a color, a texture, and the like.

A color determination section 118a determines a color within the first color range to be a color of one of a plurality of part objects under a predetermined condition, the part object belonging to one of a plurality of categories forming main parts of the model object.

For example, the color determination section 118a randomly selects a color within the first color range and determines the selected color to be a color of one of a plurality of part objects belonging to one of a plurality of categories forming main parts of the model object.

The color determination section 118a determines a color within the second color range to be a color of one of a plurality of part objects under a predetermined condition, the part object belonging to one of a plurality of categories forming secondary parts of the model object.

The color determination section 118a randomly selects a color within the second color range, and determines the selected color to be a color of one of a plurality of part objects belonging to one of a plurality of categories forming the secondary parts.

The color determination section 118a determines a color within the first color range to be a color of a first area of one of a plurality of part objects under a predetermined condition and determines a color within the third color range to be a color of a second area of the part object under another predetermined condition, the part object belonging to one of a plurality of categories forming the main parts of the model object, and the second area being smaller than the first area. The color determination section 118a determines a color within the second color range to be a color of a third area of one of a plurality of part objects under a predetermined condition and determines a color within the third color range to be a color of a fourth area of the part object under another predetermined condition, the part object belonging to one of a plurality of categories forming the secondary parts of the model object, and the fourth area being smaller than the third area.

The color determination section 118a according to this embodiment stores the determined color of the part object (i.e., an element of the model object) in the object data storage section 179b as the vertex color of a polygon that forms the part object or the color of a texture mapped onto the part object.

The texture determination section 118b selects one texture from a plurality of selectable textures under a predetermined condition, and determines the selected texture to be a texture to be mapped onto one of a plurality of part objects belonging to one of a plurality of categories forming the main parts of the model object.

The drawing section 120 performs a drawing process based on the results of various processes (game process) performed by the processing section 100 to generate an image, and outputs the generated image to the display section 190. When generating a three-dimensional game image, the drawing section 120 performs a geometric process such as coordinate transformation (world coordinate transformation or camera coordinate transformation), clipping, or perspective transformation, and creates drawing data (e.g., position coordinates of primitive vertices, texture coordinates, color data, normal vector, or alpha ($\alpha$) value) based on the processing results. The drawing section 120 draws the object (one or more primitives) subjected to perspective transformation (geometric process) in an image buffer 173 (i.e., a buffer that can store image information in pixel units (e.g., frame buffer or intermediate buffer (work buffer)); VRAM) based on the drawing data (object data). The drawing section 120 thus generates an image viewed from the virtual camera (given viewpoint) in the object space. When a plurality of virtual cameras (viewpoints) are provided, the drawing section 120 performs the drawing process so that images viewed from the virtual cameras can be displayed on one screen as divided images.

The drawing section 120 includes a geometric processing section 122, a shading processing section 124, an alpha blending section 126, and a hidden surface removal section 128.

The geometric processing section 122 performs the geometric process on the object. Specifically, the geometric processing section 122 performs the geometric process such as coordinate transformation, clipping, perspective transformation, and light source calculations. The object data (e.g., object's vertex position coordinates, texture coordinates, color data (luminance data), normal vector, or alpha value) after the geometric process (perspective transformation) is stored in the object data storage section 179.

The shading processing section 124 performs a shading process that shades in the object. Specifically, the shading processing section 124 adjusts the luminance of the drawing pixel of the object based on the results (shade information) of light source calculations performed by the geometric processing section 122. The shading processing section 124 may perform light source calculations in place of the geometric processing section 122. The shading processing section 124 may subject the object to flat shading or smooth shading (e.g., Gouraud shading or Phong shading) as the shading process.

The alpha blending section 126 performs a translucent blending process (e.g., normal alpha blending, additive alpha blending, or subtractive alpha blending) based on the alpha ($\alpha$) value ($A_{value}$). When performing normal alpha blending, the alpha blending section 126 performs a process shown by the following expressions (1) to (3).

$$R_Q=(1-\alpha)\times R_1+\alpha\times R_2 \quad (1)$$

$$G_Q=(1-\alpha)\times G_1+\alpha\times G_2 \quad (2)$$

$$B_Q=(1-\alpha)\times B_1+\alpha\times B_2 \quad (3)$$

When performing additive alpha blending, the alpha blending section 126 performs a process shown by the following expressions (4) to (6).

$$R_Q=R_1+\alpha\times R_2 \quad (4)$$

$$G_Q=G_1+\alpha\times G_2 \quad (5)$$

$$B_Q=B_1+\alpha\times B_2 \quad (6)$$

When performing subtractive alpha blending, the alpha blending section 126 performs a process shown by the following expressions (7) to (9).

$$R_Q=R_1-\alpha\times R_2 \quad (7)$$

$$G_Q=G_1-\alpha\times G_2 \quad (8)$$

$$B_Q=B_1-\alpha\times B_2 \quad (9)$$

$R_1$, $G_1$, and $B_1$ represent the RGB components of the image (original image) that has been drawn in the image buffer 173, and $R_2$, $G_2$, and $B_2$ represent the RGB components of the image to be drawn in the image buffer 173. $R_Q$, $G_Q$, and $B_Q$ represent the RGB components of the image obtained by alpha blending. Note that the alpha value is information that can be stored in association with each pixel (texel or dot), such as additional information other than the color information. The alpha value may be used as mask information, translucency (equivalent to transparency or opacity), bump information, or the like.

The hidden surface removal section 128 performs a hidden surface removal process by a Z-buffer method (depth comparison method or Z-test) using a Z-buffer 175 (depth buffer) that stores the Z-value (depth information) of the drawing pixel. Specifically, the hidden surface removal section 128 refers to the Z-value stored in the Z-buffer 175 when drawing the drawing pixel corresponding to the primitive of the object. The hidden surface removal section 128 compares the Z-value stored in the Z-buffer 175 with the Z-value of the drawing pixel of the primitive. When the Z-value of the drawing pixel is the Z-value in front of the virtual camera (e.g., a small Z-value), the hidden surface removal section 128 draws the drawing pixel and updates the Z-value stored in the Z-buffer 175 with a new Z-value.

The sound generation section 130 performs a sound generation process based on the results of various processes performed by the processing section 100 to generate game sound such as background music (BGM), effect sound, or voice, and outputs the generated game sound to the sound output section 192.

The image generation device according to this embodiment may be an image generation device dedicated to a single-player mode that allows only one player to play the game, or may be an image generation device provided with a multi-player mode that allows a plurality of players to play the game.

When a plurality of players play the game, the game image and the game sound provided to the players may be generated by one terminal.

The image generation device according to this embodiment may exchange data (e.g., input information) with one or more image generation devices connected through a network (transmission line or communication channel) to implement an online game.

2. Outline of Method According to This Embodiment 2-1. Slot

In this embodiment, the part object data is disposed (set) in each of a plurality of slots that form the model object.

The term "slot" refers to a part object data disposition space set in a model coordinate system, and corresponds to a component part of the model object. In this embodiment, body slots A1 to A14 (first slots in a broad sense) in FIG. 2 that correspond to the component parts of a human body, and item slots B1 to B10 (second slots in a broad sense) in FIG. 3 that correspond to the component parts of an ornament attached to the human body, are provided.

Figure 2:
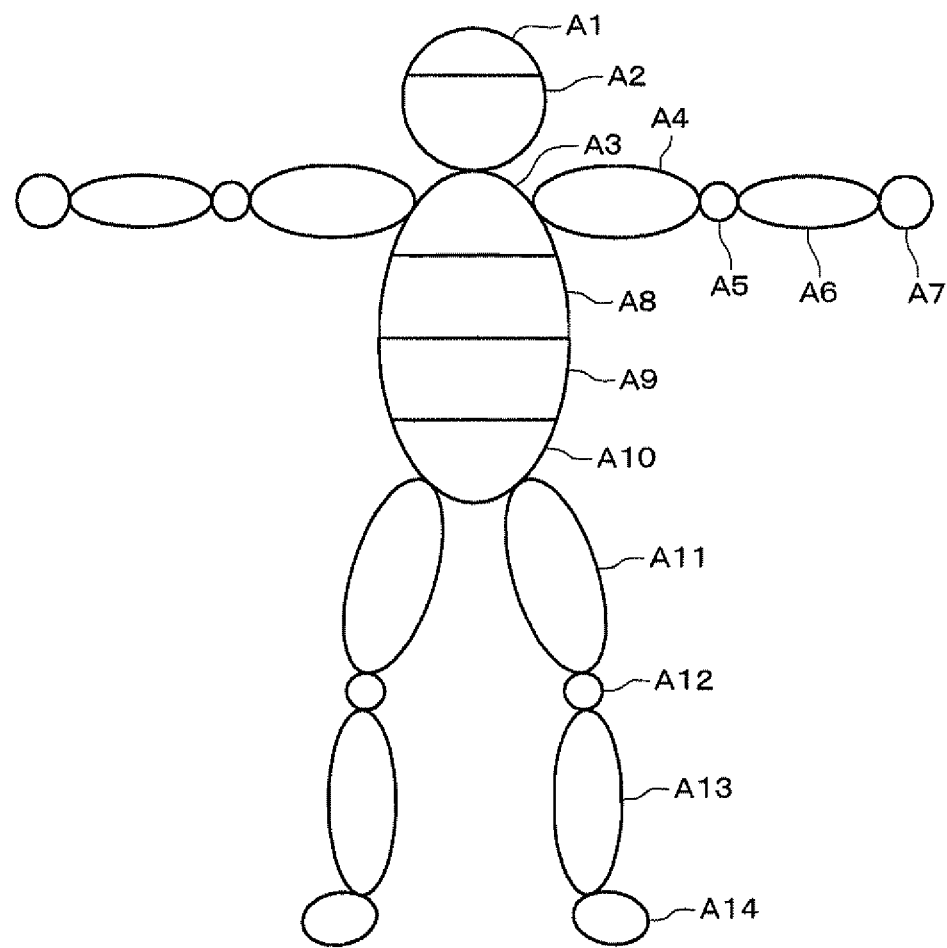
FIG. 2 is a diagram illustrating a slot.

In FIG. 2, fourteen body slots A1 to A14 correspond to the component parts of the human body. For example, the arm is made up of four body slots A4 to A7. The body slot A4 corresponds to the upper arm, the body slot A5 corresponds to the elbow, the body slot A6 corresponds to the forearm, and the body slot A7 corresponds to the hand, for example. A part object such as a shirt or a jacket can also be disposed in the body slots A1 to A14 instead of the part object corresponding to the component part of the human body. For example, parts of a short sleeve T-shirt can be formed using the body slots A3, A4, A8, and A9, and parts of a long sleeve T-shirt can be formed using the body slots A3 to A6, A8, and A9.

Figure 3:
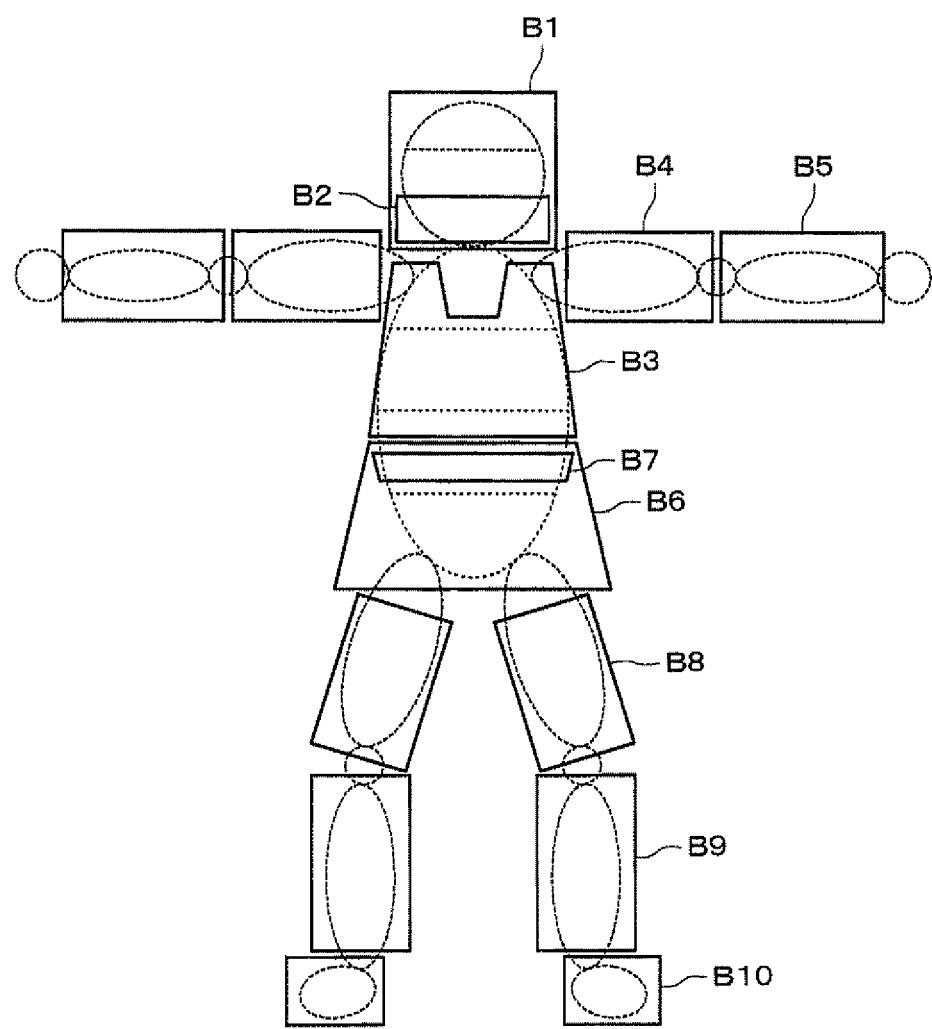
FIG. 3 is a diagram illustrating a slot.

In FIG. 3, the item slots B1 to B10 are disposed to overlap one or more body slots. The item slots B1 to B10 are used when it is necessary to dispose a plurality of pieces of part object data in layers, such as when dressing the model object in two or more suits of clothes one over the other. In other words, the item slots B1 to B10 may be referred to as overlapping slots. For example, the item slot B2 is used when disposing a beard on the face. Full armor may be set using the item slots B1, B3 to B6, and B8 to B10. The part object data that is given disposition priority over the part object data disposed in the body slots A1 to A14 is basically disposed in the item slots B1 to B10. The part object data disposed in one item slot may be given disposition priority over the part object data disposed in another item slot. For example, the item slot B7 is used when the model object wears a belt over a uniform or wears a belted skirt. The part object data that is given disposition priority over the part object data disposed in the item slot B8 is disposed in the item slot B7.

According to this embodiment, an image of a model object that wears a plurality of part objects in layers can be generated by providing the body slots A1 to A14 and the item slots B1 to B10 and disposing the part object data in each slot to form a model object. An image in which a joint is observed through the opening in armor can be generated by disposing the part object data in the item slots B1 to B10 and disposing the part object data in the body slots A1 to A14 in layers, for example.

2-2. Categorization Method

In this embodiment, each part object is stored in the part object data storage section 179b in association with one of a plurality of categories.

Specifically, one or more pieces of part object data (slot-unit part object data) disposed in one or more body slots or item slots are stored in the part object data storage section 179b in association with one category.

The relationship between the part objects is described below with reference to FIG. 4. For example, part objects "samurai helmet", "burgonet", and "top hat" are classified into a category "Head" that determines the upper part of the head of the model object, and disposed in the body slot A1.

A part object "Venetian mask" is classified into a category "Mask" that determines the mask of the model object, and disposed in the body slot A2.

In this embodiment, the priority information that indicates the disposition priority is set in advance for each category, as illustrated in FIG. 4. The priority information is used when updating the slot state data that determines the part objects disposed in the body slots A1 to A14 or the item slots B1 to B10. Note that the slot state data may be exceptionally updated regardless of the priority information.

In this embodiment, the part object data (slot-unit part object data) corresponding to each slot is stored in the part object data storage section 179b, as illustrated in FIG. 4. For example, part object data Inner_A3_1 corresponding to the slot A3, part object data Inner_A4_1 corresponding to the slot A4, part object data Inner_A8_1 corresponding to the slot A8, and part object data Inner_A9_1 corresponding to the slot A9 are stored in the part object data storage section 179b for a part object "T-shirt" in a category "Inner".

In this embodiment, when disposing the higher-order part object data, disposition clear information for clearing the setting of the slot corresponding to the lower-order part object data may be stored.

The disposition clear information specifies the slot for which the part object data is hidden behind the part object data disposed in the item slot and need not be disposed when the part object data is disposed in the body slot (e.g., A8) and the item slot (e.g., B3) in layers. When updating the slot state data, the part object data is not disposed in the slot specified by the disposition clear information, or the part object data that has been disposed is cleared based on the disposition clear information.

2-3. Selection of Part Object

In this embodiment, selection of the part object from each category is received based on input information input by the player, and the selected part object is set to be an element of the model object.

Figure 5:
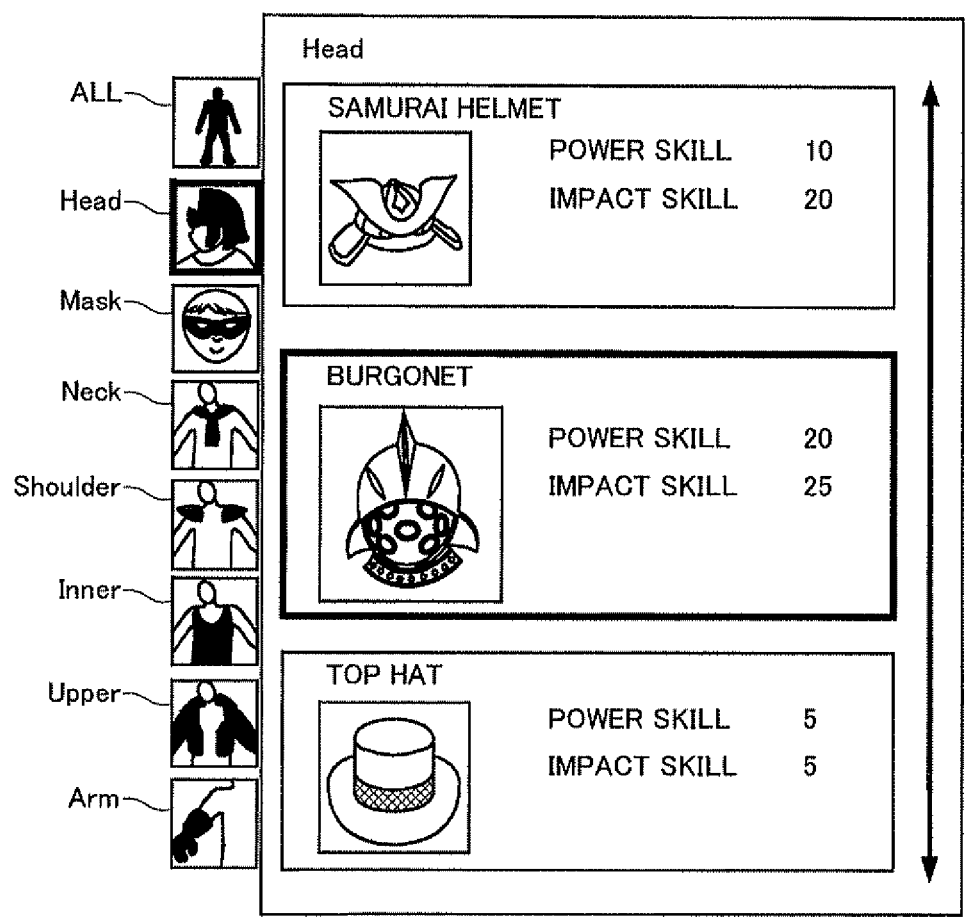
FIG. 5 illustrates an example of a part object selection screen according to one embodiment of the invention.

FIG. 5 illustrates an example of a part object selection screen. In this embodiment, selection of one of a plurality of categories is received, and selection of one of a plurality of part objects in the selected category is received, for example. FIG. 5 illustrates an example of an image in which the category "Head" is selected from a plurality of categories, and the part object "burgonet" is selected from a plurality of part objects that belong to the category "Head".

In this embodiment, a parameter (e.g., power skill value and impact skill value) used for game calculations is set for each part object, and a skill that gives an advantage to the player can be set based on the parameter. This makes it possible to change the part objects on the model object taking account of the strategy of the game.

2-4. Selection of Color of Part Object

In this embodiment, the color of each part object that forms the model object is determined based on input information input by the player.

Figure 6:
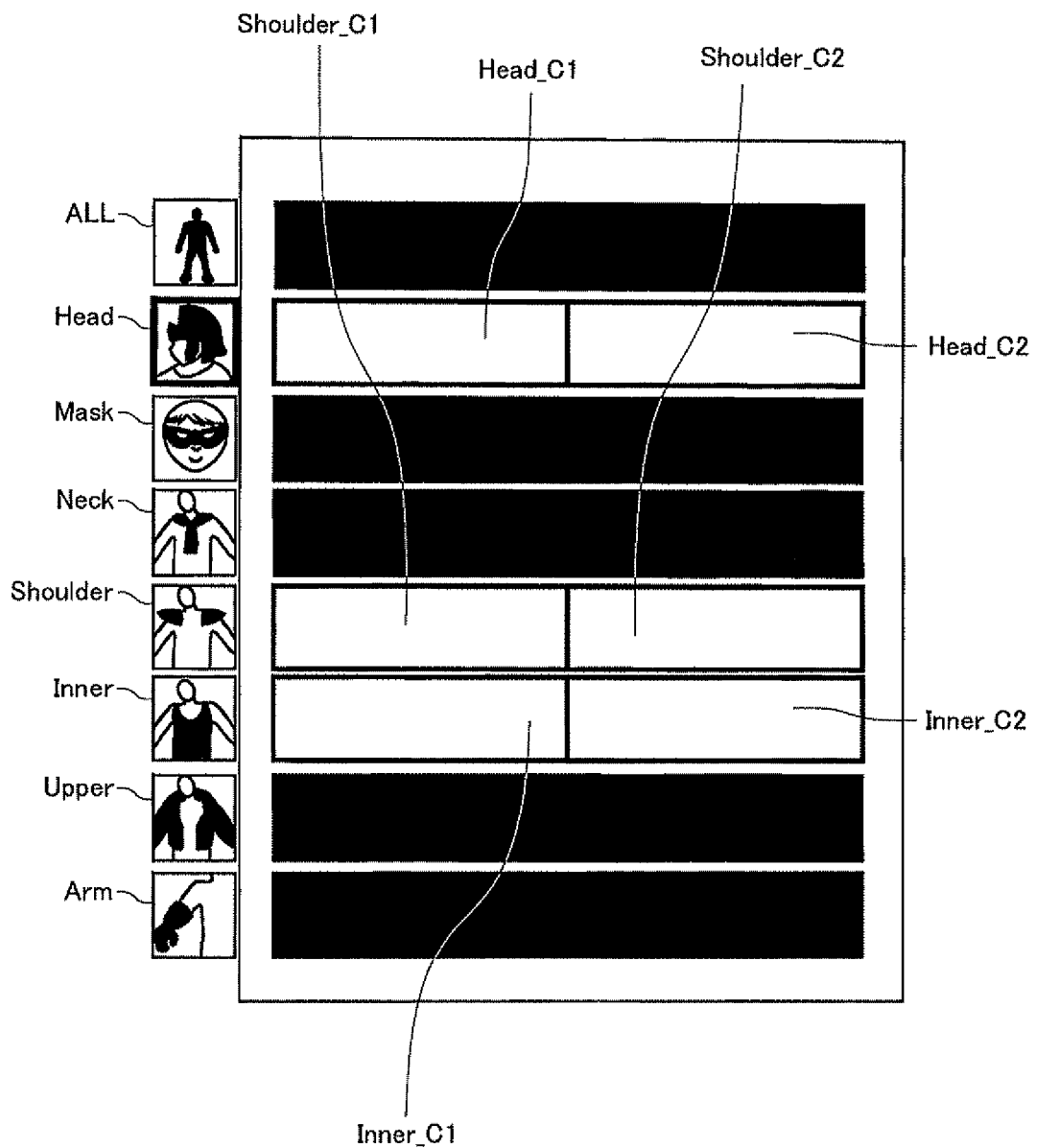
FIG. 6 illustrates an example of a part object color selection screen.

FIG. 6 illustrates an example of a color selection screen for selecting the color of the part object. In this embodiment, the color of the part object of each of categories that forms the model object is determined based on input information input by the player, for example. In FIG. 6, a color Head_C1 assigned to an area 1 of the part object (e.g., "top hat") in the category "Head" and a color Head_C2 assigned to an area 2 of the part object are displayed, for example.

In this embodiment, a plurality of levels of saturation (vividness) are provided, and a color can be determined based on the saturation. For example, red having a saturation level 1 is dark red, and red having a saturation level 9 is clear and bright red.

In this embodiment, when selection of the area of a given part object (e.g., the area 1 of the part object "top hat") has been received, color palette coordinates (hue and saturation) for determining the color (e.g., Head_C1) of the selected area are displayed on the display section 190. The color of the selected area is determined based on the hue and the saturation indicated by the coordinate values input by the player.

2-5. Setting of Body Information

Figure 7:
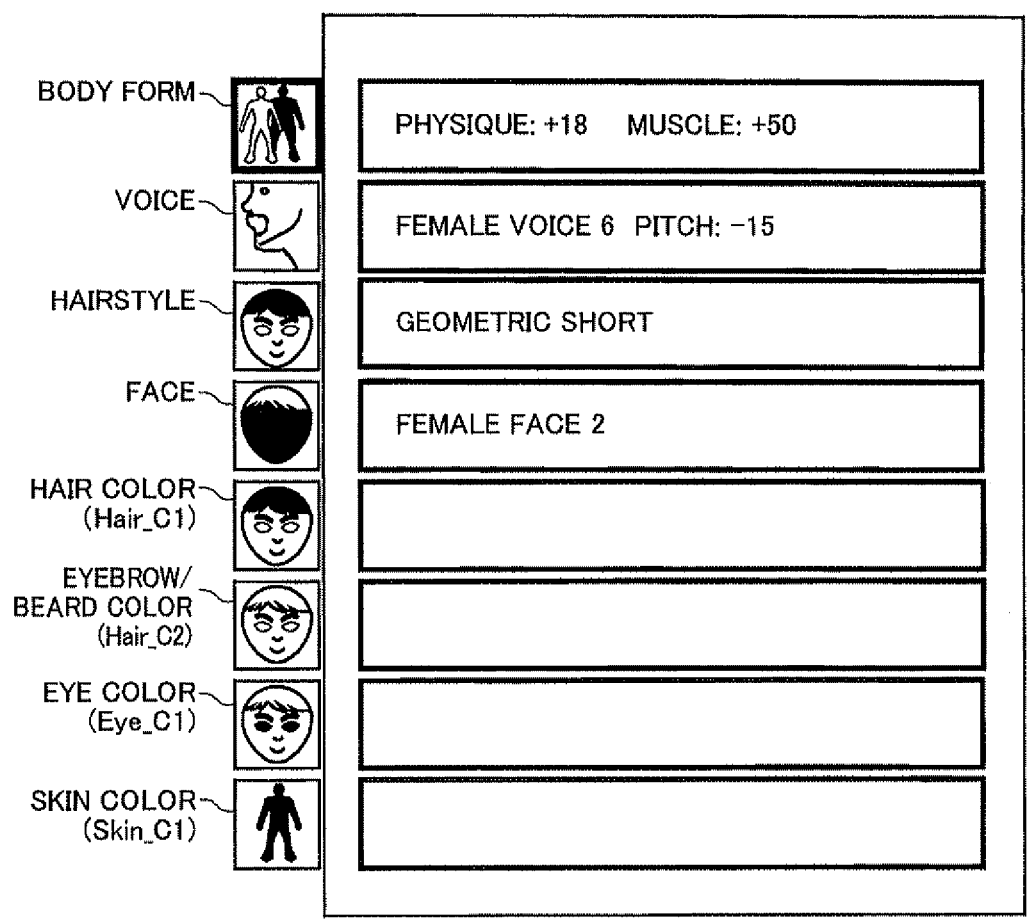
FIG. 7 illustrates an example of a model object body information setting screen.

In this embodiment, body information of the model object can be determined based on input information input by the player. FIG. 7 illustrates an example of a model object body information setting screen.

In this embodiment, a hair color Hair_C1, an eyebrow/beard color Hair_C2, an eye color Eye_C1, and a skin color Skin_C1 of the model object can be determined using a method similar to the pail object color determination method.

2-6. Slot State Data Update Process

In this embodiment, the part object data of the part object that forms the model object is disposed in the slot by a slot state data update process.

In this embodiment, it is determined that the slot state data of the slot corresponding to the part object data of the part object selected by the player must be updated when no part object is disposed in the slot that corresponds to the part object selected by the player, and the part object data of the part object selected by the player is disposed in the slot that corresponds to the part object data of the part object selected by the player to update the slot state data.

For example, when the player has selected the part object "top hat" from a plurality of part objects that belong to the category "Head" and the part object in the category "Head" is not disposed, the part object data of the part object "top hat" is disposed to update the slot state data.

In this embodiment, when the part object data of the part object that is other than the part object selected by the player and belongs to the same category as the part object selected by the player has been disposed, the part object data of the part object selected by the player is disposed in place of the part object data of the part object other than the part object selected by the player to update the slot state data.

For example, when the player has selected the part object "top hat" from the part objects that belong to the category "Head" and the part object data of the part object "samurai helmet" that belongs to the category "Head" has been disposed in the slot, the part object data of the part object "top hat" is disposed in place of the part object data of the part object "samurai helmet" to update the slot state data.

In this embodiment, when the part object data of the part object that belongs to a category differing from the category of the part object data of the part object selected by the player has been disposed in the slot that corresponds to the part object data of the part object selected by the player, the disposition priorities of the categories determined based on the priority information are compared in slot units to update the slot state data.

Note that whether or not to update the slot state data is determined in slot units corresponding to the part object data of the part object even when a plurality of slots are designated for the part object, and the slot state data is updated in slot units. This minimizes the amount of object data that forms the model object while appropriately dressing the model object in two or more suits of clothes one over the other.

Specifically, the slot state data may be updated as described in (A) to (C) given below.

(A) When the part object data of another part object (i.e., a part object that belongs to a category differing from the category of the part object data of the part object selected by the player) has been disposed in the slot that corresponds to the part object data of the part object selected by the player and the part object data of the part object selected by the player is given a disposition priority higher than that of the other part object, it is determined that the slot state data must be updated, and the part object data of the part object selected by the player is disposed in the slot in place of the part object data of the other part object to update the slot state data.

(B) When the part object data of another part object (i.e., a part object that belongs to a category differing from the category of the part object data of the part object selected by the player) has been disposed in the slot that corresponds to the part object data of the part object selected by the player and the part object data of the part object selected by the player is given a disposition priority lower than that of the other part object, it is determined that the slot state data should not be updated. In this case, the part object data of the other part object is continuously disposed without updating the slot state data of the slot.

(C) When the part object data of another part object (i.e., a part object that belongs to a category differing from the category of the part object data of the part object selected by the player) has been disposed in the slot that corresponds to the part object data of the part object selected by the player and the part object data of the part object selected by the player is given a disposition priority equal to that of the other part object, the part object data of the part object selected by the player is disposed in the slot in place of the part object data of the other part object to update the slot state data.

3. Method of Generating Model Object

The method according to this embodiment allows the player to create a desired model object. However, the process of selecting the part object for each category and determining the color of each part object may be troublesome depending on the player. In this embodiment, a model object that reflects the preference of the player is created in advance so that the player can easily create an original character. Specifically, the character of the model object is roughly determined based on input information input by the player, and the part object set as an element of the model object is determined based on the character (parameter).

In this embodiment, when the part object set as an element of the model object has been determined, the default slot state data of the model object provided in advance is updated to dispose the (slot-unit) part object data of the part object set as an element of the model object in each slot.

Figure 8:
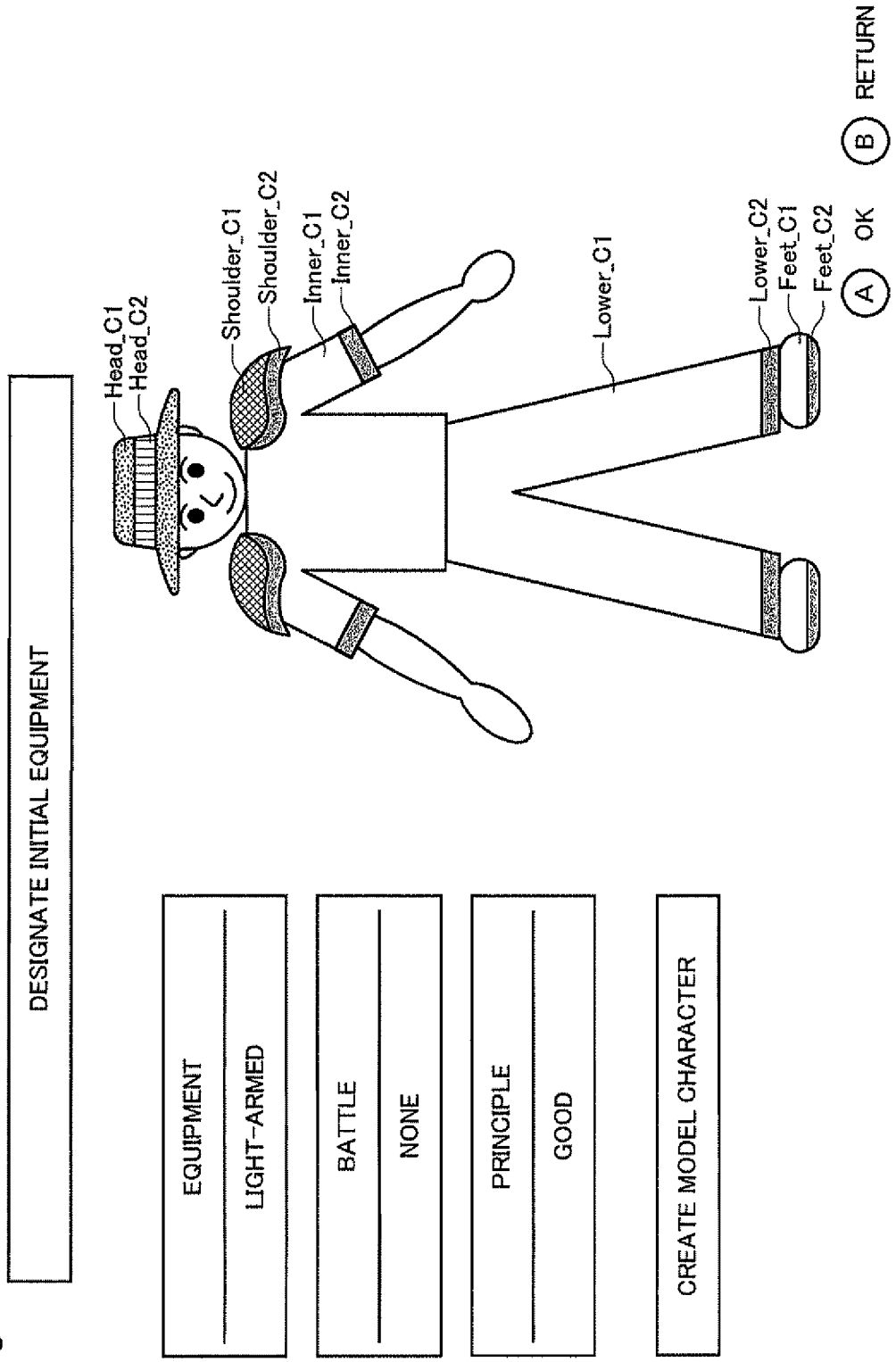
FIG. 8 illustrates an example of a model object creation screen.

FIG. 8 illustrates an example of a model object creation screen. In this embodiment, selection of parameters for items "equipment", "battle", and "principle" is received based on input information input by the player, and the part object that forms the model object is determined based on the selected parameters. For example, a parameter "light-armed", "heavy-armed", or the like is set for the item "equipment". A parameter "attack", "defense", "none", or the like is set for the item "battle". A parameter "good" or "evil" is set for the item "principle". In this embodiment, the part object is determined based on these parameters.

For example, a weight parameter is set in advance for each part object. When the parameter set for the item "equipment" is "light-armed", one part object is randomly selected from a plurality of part objects for which the weight parameter is within a predetermined range (0≤weight parameter<100). When the parameter set for the item "equipment" is "heavy-armed", one part object is randomly selected from a plurality of part objects for which the weight parameter is within a predetermined range (100≤weight parameter). A lottery process may be performed using a given algorithm based on the parameter of the item "equipment" selected by the player, and the part object may be selected based on the lottery result. For example, when the player has selected the parameter "light-armed", the part object corresponding to the parameter "light-armed" may be selected with a predetermined win probability (e.g., 80%).

In this embodiment, when selection of the parameter "attack" for the item "battle" has been received, one part object is randomly selected from a plurality of part objects having a high attack capability (e.g., a plurality of part objects for which the power skill value is equal to or larger than a predetermined value). When selection of the parameter "defense" for the item "battle" has been received, one part object is randomly selected from a plurality of part objects having a high defense capability. A lottery process may be performed based on a given algorithm based on the parameter of the item "battle" selected by the player, and the part object may be selected based on the lottery result.

Identification information "good" or "evil" is set in advance corresponding to each part object, for example. When the parameter "good" has been selected for the item "principle", one part object is randomly selected from a plurality of part objects corresponding to the identification information "good". When the parameter "evil" has been selected for the item "principle", one part object is randomly selected from a plurality of part objects corresponding to the identification information "evil".

In this embodiment, the part object of to each category is determined based on all of the parameters selected by the player for the items "equipment", "battle", and "principle". In the example of FIG. 8, one part object is randomly selected from a plurality of part objects for which the weight parameter is within a predetermined range (0≤weight parameter<100) and which correspond to the identification information "good".

In this embodiment, the part object need not necessarily be determined for each of the categories. For example, only the part objects of given categories (e.g., categories "Head", "Shoulder", "Inner", "Lower", and "Feet") may be determined, as illustrated in FIG. 8.

In this embodiment, the body information of the model object is also randomly selected (determined).

4. Color Adjustment Method

In this embodiment, the part object set as an element of the model object is determined. However, since the color of the part object is not uniform, a model object that lacks unity may be generated. Therefore, this embodiment employs a method that determines the color of the part object set as an element of the model object.

4-1. Method of Determining Color of Part Object

In this embodiment, the first color range, the second color range, and the third color range are selected (determined) from a plurality of color ranges.

The term "color range" refers to a color range (scale, extent, limits) classified by hue, brightness, and saturation. For example, the plurality of color ranges include a red color range, a yellow color range, a green color range, a blue color range, and a purple color range. In this embodiment, the color range is selected (determined) based on the levels of saturation (vividness). For example, a red color range, a yellow color range, a green color range, a blue color range, and a purple color range of a saturation level 1 and a red color range, a yellow color range, a green color range, a blue color range, and a purple color range of a saturation level 9 are provided in advance.

The first color range is a color range for determining the color of the primary area (the primary surface area, the major surface area) of each of a plurality of part objects belonging to categories forming main parts (main regions, large parts, large regions) of the model object. The main parts are parts of the model object each having a large surface area such as a trunk part. The categories (the category group) forming the main parts include the categories "Inner", "Upper", and "Lower", for example. Specifically, the first color range corresponds to the basic colors or the concept colors of the model object.

The primary area is a largest area among areas of a part object, each having a single color. In the example of FIG. 8, the area of the part object of the category "Inner" to which a color "Inner_C1" is assigned is the primary area. In FIG. 8, the area of the part object of the category "Shoulder" to which a color "Shoulder_C1" is assigned is the primary area.

The second color range is a color range for determining the color of the primary area of each of a plurality of part objects belonging to categories forming secondary parts (secondary regions, sub parts, small parts, small regions) of the model object. The secondary parts are parts of the model object each having a surface area smaller than the main parts (e.g., end part). The categories (the category group) forming the secondary parts include the categories "Head", "Mask", "Neck", "Shoulder", and "Feet", for example. Specifically, the second color range corresponds to the secondary color of the model object.

The third color range is a color range for determining the color of the secondary area (the secondary surface area, the minor surface area) of each of a plurality of part objects belonging to categories forming the main parts and the secondary parts of the model object. The secondary area is one of areas of a part object having a single color smaller than the primary area. When a plurality of areas having a surface area smaller than the primary area exist, one of the areas is determined to be the secondary area. In the example of FIG. 8, the area of the part object of the category "Inner" to which a color "Inner_C2" is assigned is the secondary area. In FIG. 8, the area of the part object of the category "Shoulder" to which a color "Shoulder_C2" is assigned is the secondary area. Specifically, the third color range corresponds to the accent color of the model object.

The method of determining the first color range, the second color range, and the third color range according to this embodiment is described in detail below. In this embodiment, the saturation is determined based on the parameter "good" or "evil" selected for the item "principle" based on input information input by the player. For example, the saturation level 9 is determined to be the saturation when the parameter "good" has been selected for the item "principle", and the saturation level 1 is determined to be the saturation when the parameter "evil" has been selected for the item "principle". In the example of FIG. 8, since the parameter "good" has been selected for the item "principle", the saturation level 9 is determined to be the saturation.

In this embodiment, the first color range, the second color range, and the third color range are selected from a plurality of color ranges of the determined saturation. In this embodiment, the first color range, the second color range, and the third color range differ from one another. For example, the first color range, the second color range, and the third color range differing from one another are randomly selected from the red color range, the yellow color range, the green color range, the blue color range, and the purple color range of the saturation level 9.

A process of determining the colors of the primary area and the secondary area of each part object based on the first color range, the second color range, and the third color range thus selected is described below with reference to FIG. 9.

In this embodiment, a color within the first color range is randomly selected for each of a plurality of part objects belonging to one of the categories forming the main parts of the model object, and the selected color is determined to be the color of the primary area of a corresponding part object.

For example, the blue color range of the saturation level 9 has been determined to be the first color range. In this case, a color (e.g., dark blue) randomly selected from the blue color range of the saturation level 9 is determined to be the color of the primary area of the part object corresponding to the category "Inner" (main part). A color (e.g., light blue) randomly selected from the blue color range of the saturation level 9 is determined to be the color of the primary area of the part object of the category "Lower" (main part).

Therefore, the concept colors of the model object are unified into blue (i.e., a unified color tone is achieved). In this embodiment, since a color within the first color range is randomly selected for each of a plurality of part objects belonging to one of the categories forming the main parts of the model object, the colors of the primary areas of the part objects of the categories "Inner" and "Lower" may differ from each other within the blue color range. Therefore, the color arrangement does not become monotonous.

In this embodiment, a color within the second color range is randomly selected for each of a plurality of part objects belonging to one of the categories forming the secondary parts of the model object, and the selected color is determined to be the color of the primary area of a corresponding part object.

For example, the red color range of the saturation level 9 has been determined to be the second color range. In this case, a color (e.g., dark red) randomly selected from the red color range of the saturation level 9 is determined to be the color of the primary area of the part object of the category "Head" (secondary part). A color (e.g., red close to pink) randomly selected from the red color range of the saturation level 9 is determined to be the color of the primary area of the part object of the category "Shoulder" (secondary part). A color (e.g., wine red) randomly selected from the red color range of the saturation level 9 is determined to be the color of the primary area of the part object of the category "Feet" (secondary part).

Therefore, the secondary color of the model object is unified into red (i.e., a unified color tone is achieved). In this embodiment, since a color within the second color range is randomly selected for each of a plurality of part objects belonging to one of the categories forming the secondary parts of the model object, the colors of the primary areas of the part objects of the categories "Head", "Shoulder", and "Feet" may differ from each other within the red color range. Therefore, the color arrangement does not become monotonous.

In this embodiment, a color within the third color range is randomly selected for each of a plurality of part objects belonging to one of the categories forming the main parts and the secondary parts of the model object, and the selected color is determined to be the color of the secondary area of a corresponding part object.

For example, the green color range of the saturation level 9 has been determined to be the third color range. In this case, a color (e.g., green blue) randomly selected from the green color range of the saturation level 9 is determined to be the color of the secondary area of the part object of the category "Inner" (main part). A color (e.g., yellowish green) randomly selected from the green color range of the saturation level 9 is determined to be the color of the secondary area of the part object of the category "Lower" (main part). A color randomly selected from the green color range of the saturation level 9 is determined to be the color of the secondary area of the part object of the category "Feet" (secondary part). A color is similarly determined for the categories "Shoulder" and "Feet".

Therefore, the accent color of the model object is unified into green (i.e., a unified color tone is achieved). Moreover, since the accent colors of the part objects may differ to some extent from each other within the green color range, the color arrangement does not become monotonous.

When the colors of the primary area and the secondary area of each part object have been determined based on the first color range, the second color range, and the third color range, the determined colors are stored in a model buffer of the model object data storage section 179*a*.

For example, when the color of the primary area of the part object "top hat" belonging to the category "Head" has been determined, the determined color is stored in the model buffer as a color "Head_C1" for the model object. The determined color is used as the vertex color of a polygon that forms the primary area of the part object "top hat" of the model object or the color of a texture mapped onto the primary area of the part object "top hat" of the model object when the drawing section 120 performs the drawing process, for example.

4-2. Method of Determining Skin Color

In this embodiment, one skin color range is randomly selected from three skin color ranges when creating the model object, and a color within the selected skin color range is determined to be a color "Skin_C1" of the skin of the model object. For example, a human white skin color range, a human black skin color range, and a non-human skin color range (green or purple) are provided, and one of the skin color ranges is randomly selected. In this embodiment, a color randomly selected within the selected skin color range is determined to be the color of the skin of the model object. In particular, since the human white skin color range and the human black skin color range are provided in advance, a color that is easily recognized to be a human skin color can be set.

4-3. Method of Determining Colors of Hair and Eyebrows/Beard

Figure 10:
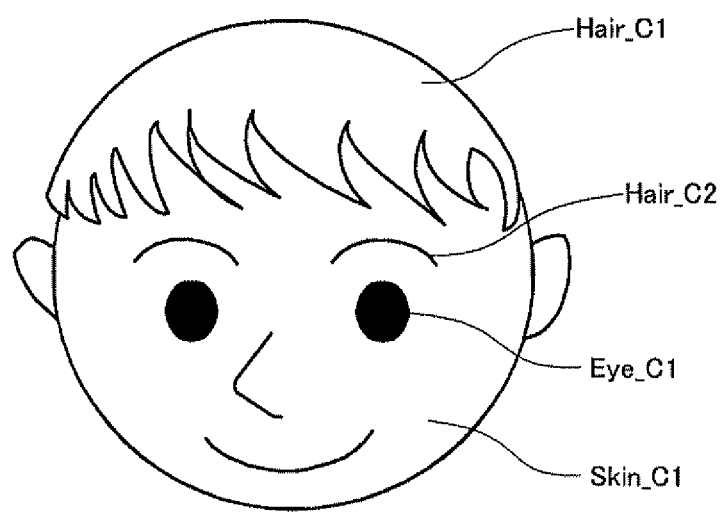
FIG. 10 is a diagram for describing a method of determining the colors of the skin and the hair of a model object.

In this embodiment, a plurality of hair color ranges (e.g., red, brown, black, and blond) are provided, and one hair color range is randomly selected from the plurality of hair color ranges when creating the model object. As illustrated in FIG. 10, a color (e.g., dark brown) randomly selected within the hair color range is determined to be a hair color "Hair_C1", for example. Likewise, a color (e.g., chestnut) randomly selected within the hair color range is determined to be an eyebrows/beard color "Hair_C2". Therefore, since similar colors are assigned to the hair and the eyebrows/beard, a unified model object can be created.

5. Process According to This Embodiment

Figure 11:
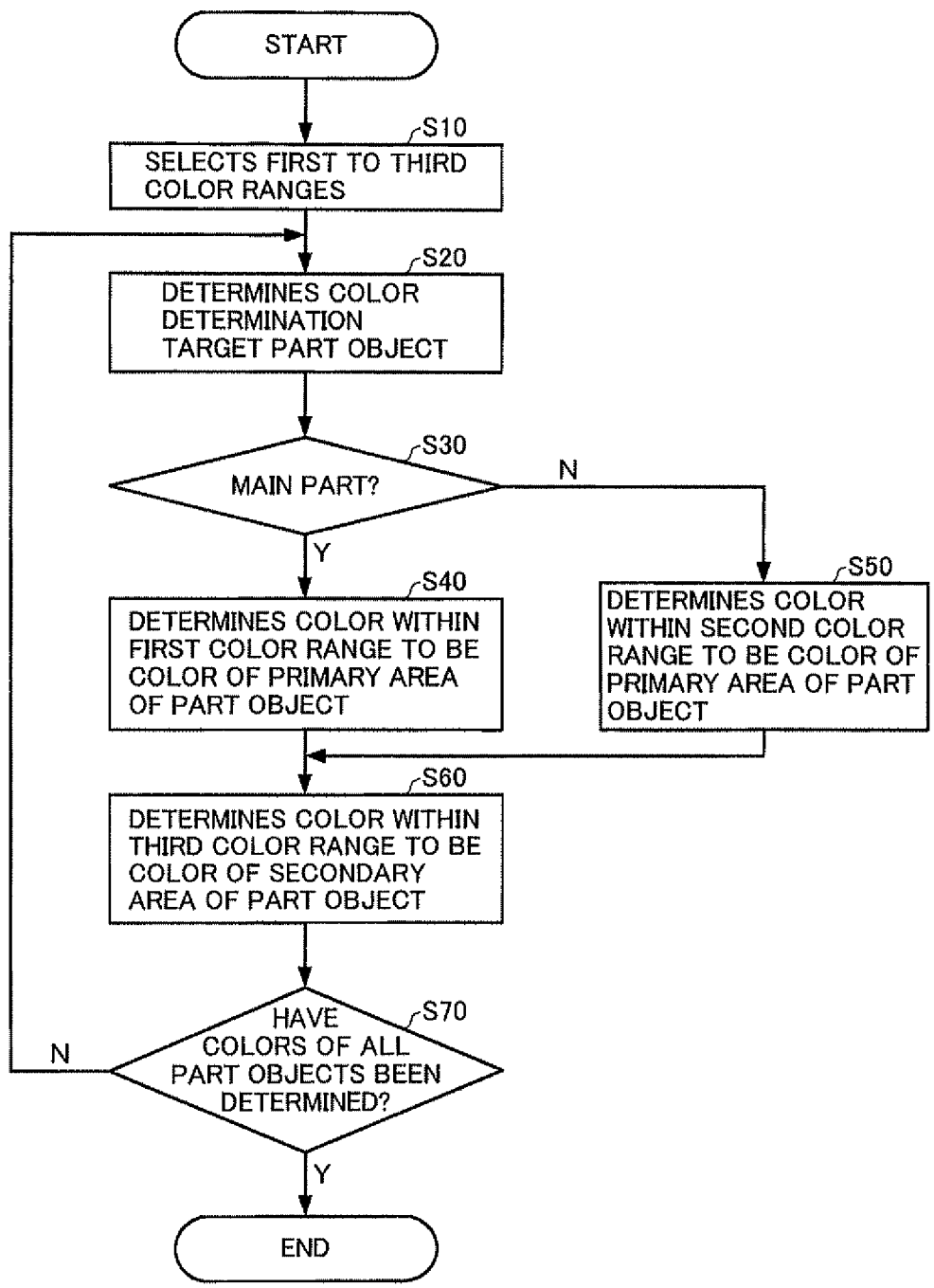
FIG. 11 is a flowchart illustrating an example of a process according to one embodiment of the invention.

A process of determining the color of each part object set as an element of the model object according to this embodiment is described below with reference to FIG. 11.

The first color range, the second color range, and the third color range are selected from a plurality of color ranges (step S10). The color determination target part object is then determined (step S20). Whether or not the category of the part object is included in the categories that form the main parts is determined (step S30). When the category of the part object is included in the categories that form the main parts (Y in step S30), a color within the first color range is determined to be the color of the primary area of the part object (step S40). When the category of the part object is not included in the categories that form the main parts (N in step S30), the category of the part object is determined to be included in the categories that form the secondary parts, and a color within the second color range is determined to be the color of the primary area of the part object (step S50).

A color within the third color range is then determined to be the color of the secondary area of the part object (step S60). Whether or not the colors of all of the part objects have been determined is determined (step S70). When the colors of all of the part objects have been determined (Y in step S70), the process ends. When the colors of all of the part objects have not been determined (N in step S70), the process returns to the step S20. The process is thus completed.

6. Application Example

Figure 12:
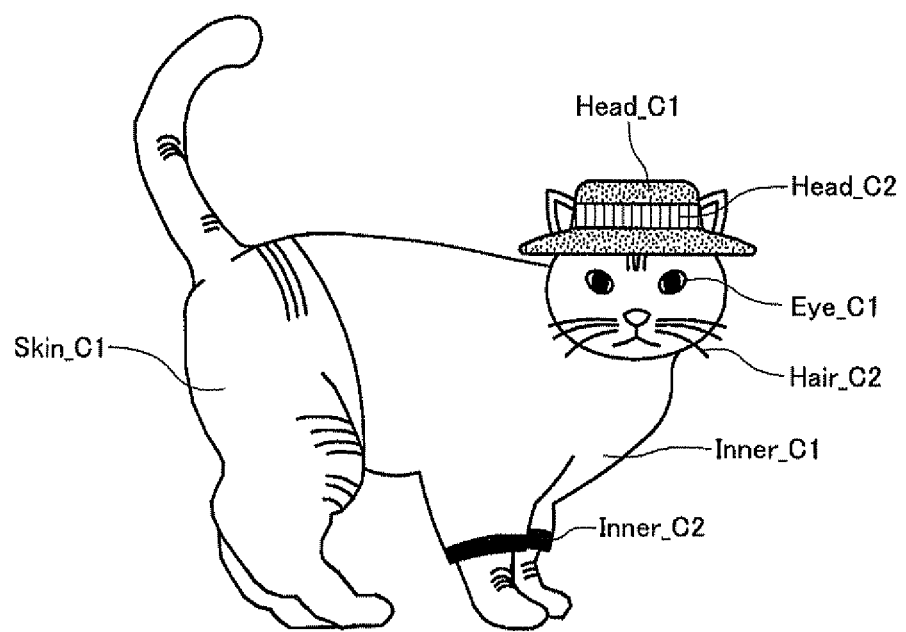
FIG. 12 illustrates a model object application example.

This embodiment may be applied to an animal model object, a monster model object, or the like instead of a human model object. As illustrated in FIG. 12, a skin color (Skin_C1) and a whisker color (Hair_C2) of a cat object may be determined in the same manner as described above, for example.

In this embodiment, the color of the part object set as an element of the model object customized by the player may be determined.

In this embodiment, the colors of some part objects (e.g., only the part objects belonging to the categories "Head" and "Feet") among the part objects set as elements of the model object may be determined.

When three or more colors are assigned to the part object, the color range may be selected for each area, and a color within the selected color range may be determined for each area.

For example, when a part object among a plurality of part objects that form the model object does not have a primary area, but has four secondary areas (i.e., colors are assigned to four areas of the part object), a fourth color range and a fifth color range are selected in addition to the first color range, the second color range, and the third color range.

A color within the first color range is determined to be the color of the first secondary area, a color within the third color range is determined to be the color of the second secondary area, a color within the fourth color range is determined to be the color of the third secondary area, and a color within the fifth color range is determined to be the color of the fourth secondary area for each part object belonging to one of the categories forming the main parts of the model object. A color within the second color range is determined to be the color of the first secondary area, a color within the third color range is determined to be the color of the second secondary area, a color within the fourth color range is determined to be the color of the third secondary area, and a color within the fifth color range is determined to be the color of the fourth secondary area for each part object belonging to one of the categories forming the secondary parts of the model object. Note that the relationship "first secondary area≥second secondary area≥third secondary area≥fourth secondary area" is satisfied.

In this embodiment, the above-described method may be applied to determine a texture. For example, a plurality of textures are selected from a plurality of selectable textures based on input information input by the player, one texture is selected from the selected textures, and the selected texture is determined to be the texture to be mapped onto the part object.

For example, a plurality of textures are selected from a plurality of polka-dotted textures, a plurality of striped textures, a plurality of checkered textures, a plurality of star-shaped textures, and a plurality of heart-shaped textures based on the principle (good or evil) selected based on input information input by the player. When a plurality of polka-dotted textures (polka-dotted texture group) have been selected, one texture is randomly selected from a large polka-dotted texture, a medium polka-dotted texture, and a small polka-dotted texture. The selected texture (e.g., small polka-dotted texture) is determined to be a texture to be mapped onto the primary area of a corresponding part object among a plurality of part objects belonging to one of the categories forming the main parts of the model object. Likewise, a texture randomly selected from a plurality of striped textures is determined to be the texture to be mapped onto the primary area of each of a plurality of part objects belonging to one of the categories forming the secondary parts of the model object, and a texture randomly selected from a plurality of a heart-shaped textures is determined to be the texture to be mapped onto the secondary area of each of a plurality of part objects belonging to one of the categories forming the main parts and the secondary parts of the model object.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A program that is stored in a computer-readable information storage medium and generates an image of a model object formed by a plurality of part objects, the program causing a computer to function as:
   a storage section that stores the plurality of part objects, each of the plurality of part objects being classified into one of a plurality of categories;
   a setting section that selects a part object from the plurality of part objects for each of the plurality of categories, and sets the selected part object as an element of the model object;
   a color range determination section that selects a first color range from a plurality of color ranges based on input information; and
   a color determination section that determines a color within the first color range to be a color of one of part objects corresponding to categories that form main parts of the model object under a predetermined condition.

2. The program as defined in claim 1,
   wherein the color determination section randomly selects a color within the first color range and determines the selected color to be a color of one of the part objects.

3. The program as defined in claim 1,
   wherein the color range determination section selects a second color range that differs from the first color range from the plurality of color ranges; and
   wherein the color determination section determines a color within the second color range to be a color of one of part objects corresponding to categories that form secondary parts of the model object under a predetermined condition.

4. The program as defined in claim 3,
   wherein the color determination section randomly selects a color within the second color range and determines the selected color to be a color of one of the part objects.

5. The program as defined in claim 3,
   wherein the color range determination section selects a third color range that differs from the first color range and the second color range from among the plurality of color ranges;
   wherein the color determination section determines a color within the first color range to be a color of a first area of one of the part objects corresponding to categories that form the main parts of the model object under a predetermined condition, and determines a color within the third color range to be a color of a second area of one of the part objects under a predetermined condition, the second area being smaller than the first area; and
   wherein the color determination section determines a color within the second color range to be a color of a third area of one of the part objects corresponding to categories that form the secondary parts of the model object under a predetermined condition, and determines a color within the third color range to be a color of a fourth area of one of the part objects under a predetermined condition, the fourth area being smaller than the third area.

6. A program that is stored in a computer-readable information storage medium and generates an image of a model object formed by a plurality of part objects, the program causing a computer to function as:
   a storage section that stores the plurality of part objects, each of the plurality of part objects being classified into one of a plurality of categories;

a setting section that selects a part object from the plurality of part objects for each of the plurality of categories, and sets the selected part object as an element of the model object;

a selectable design information determination section that determines a plurality of pieces of selectable design information based on input information; and a design information determination section that selects one piece of design information from the plurality of pieces of selectable design information under a predetermined condition, and determines the selected piece of design information to be design information of one of part objects corresponding to categories that form main parts of the model object.

7. A program that is stored in a computer-readable information storage medium and generates an image of a model object formed by a plurality of part objects, the program causing a computer to function as:

a storage section that stores the plurality of part objects, each of the plurality of part objects being classified into one of a plurality of categories;

a setting section that selects a part object from the plurality of part objects for each of the plurality of categories, and sets the selected part object as an element of the model object;

a selectable texture determination section that determines a plurality of selectable textures based on input information; and a texture determination section that selects one texture from the plurality of selectable textures under a predetermined condition, and determines the selected texture to be a texture to be mapped onto one of part objects corresponding to categories that form main parts of the model object.

8. An image generation device that generates an image of a model object formed by a plurality of part objects, the image generation device comprising:

a storage section that stores the plurality of part objects, each of the plurality of part objects being classified into one of a plurality of categories;

a setting section that selects a part object from the plurality of part objects for each of the plurality of categories, and sets the selected part object as an element of the model object;

a color range determination section that selects a first color range from a plurality of color ranges based on input information; and a color determination section that determines a color within the first color range to be a color of one of part objects corresponding to categories that form main parts of the model object under a predetermined condition.

9. An image generation device that generates an image of a model object formed by a plurality of part objects, the image generation device comprising:

a storage section that stores the plurality of part objects, each of the plurality of part objects being classified into one of a plurality of categories;

a setting section that selects a part object from the plurality of part objects for each of the plurality of categories, and sets the selected part object as an element of the model object;

a selectable design information determination section that determines a plurality of pieces of selectable design information based on input information; and a design information determination section that selects one piece of design information from the plurality of pieces of selectable design information under a predetermined condition, and determines the selected piece of design information to be design information of one of part objects corresponding to categories that form main parts of the model object.

10. An image generation device that generates an image of a model object formed by a plurality of part objects, the image generation device comprising:

a storage section that stores the plurality of part objects, each of the plurality of part objects being classified into one of a plurality of categories;

a setting section that selects a part object from the plurality of part objects for each of the plurality of categories, and sets the selected part object as an element of the model object;

a selectable texture determination section that determines a plurality of selectable textures based on input information; and a texture determination section that selects one texture from the plurality of selectable textures under a predetermined condition, and determines the selected texture to be a texture to be mapped onto one of part objects corresponding to categories that form main parts of the model object.

11. An image generation method of generating an image of a model object formed by a plurality of part objects, the image generation method, performed by an image generation device having a processor, comprising:

storing the plurality of part objects in a storage section, each of the plurality of part objects being classified into one of a plurality of categories;

selecting a part object from the plurality of part objects for each of the plurality of categories, and sets the selected part object as an element of the model object;

selecting a first color range from a plurality of color ranges based on input information; and determining a color within the first color range to be a color of one of part objects corresponding to categories that form main parts of the model object under a predetermined condition.

12. An image generation method of generating an image of a model object formed by a plurality of part objects, the image generation method, performed by an image generation device having a processor, comprising:

storing the plurality of part objects in a storage section, each of the plurality of part objects being classified into one of a plurality of categories;

selecting a part object from the plurality of part objects for each of the plurality of categories, and sets the selected part object as an element of the model object;

determining a plurality of pieces of selectable design information based on input information; and selecting one piece of design information from the plurality of pieces of selectable design information under a predetermined condition, and determining the selected piece of design information to be design information of one of part objects corresponding to categories that form main parts of the model object.

13. An image generation method of generating an image of a model object formed by a plurality of part objects, the image generation method, performed by an image generation device having a processor, comprising:

storing the plurality of part objects in a storage section, each of the plurality of part objects being classified into one of a plurality of categories;

selecting a part object from the plurality of part objects for each of the plurality of categories, and sets the selected part object as an element of the model object;

determining a plurality of selectable textures based on input information; and selecting one texture from the plurality of selectable textures under a predetermined condition, and determining the selected texture to be a texture to be mapped onto one of part objects corresponding to categories that form main parts of the model object.

* * * * *